(12) United States Patent
Guerrero et al.

(10) Patent No.: US 11,676,769 B2
(45) Date of Patent: Jun. 13, 2023

(54) MULTI-DIRECTIONAL AND MULTI-CHANNEL ANODE FOR ENHANCEMENT OF CAPACITOR PERFORMANCE

(71) Applicant: KEMET Electronics Corporation, Fort Lauderdale, FL (US)

(72) Inventors: Christian L. Guerrero, Simpsonville, SC (US); Siva Jyoth Lingala, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 67 days.

(21) Appl. No.: 17/474,845

(22) Filed: Sep. 14, 2021

(65) Prior Publication Data
US 2023/0078854 A1  Mar. 16, 2023

(51) Int. Cl.
*H01G 9/042* (2006.01)
*H01G 9/048* (2006.01)
*H01G 9/15* (2006.01)

(52) U.S. Cl.
CPC ............ *H01G 9/042* (2013.01); *H01G 9/048* (2013.01); *H01G 9/15* (2013.01)

(58) Field of Classification Search
CPC ........... H01G 9/15; H01G 9/048; H01G 9/042
See application file for complete search history.

(56) References Cited

U.S. PATENT DOCUMENTS

| | | | | |
|---|---|---|---|---|
| 3,345,545 A * | 10/1967 | Bourgault | ............... | H01G 9/052 361/529 |
| 5,949,639 A * | 9/1999 | Maeda | .................... | H01G 9/052 361/523 |
| 6,191,936 B1 | 2/2001 | Webber et al. | | |
| 7,207,103 B2 * | 4/2007 | Poltorak | ................. | B30B 11/34 29/25.42 |
| 11,328,874 B2 * | 5/2022 | Djebara | ................. | H01G 9/048 |
| 2007/0035912 A1 * | 2/2007 | Hahn | ..................... | H01G 9/012 361/528 |
| 2007/0232012 A1 * | 10/2007 | Takatani | ................... | H01G 9/15 438/381 |
| 2010/0302710 A1 * | 12/2010 | Zednicek | ................. | H01G 9/15 29/25.03 |
| 2014/0268502 A1 * | 9/2014 | Biler | ...................... | H01G 9/052 205/207 |
| 2014/0321029 A1 * | 10/2014 | Djebara | ............... | H01G 9/0425 361/528 |
| 2020/0273627 A1 * | 8/2020 | Chacko | ................... | B22F 5/006 |

* cited by examiner

*Primary Examiner* — David M Sinclair
(74) *Attorney, Agent, or Firm* — Joseph T. Guy; Patent Filing Specialist Inc.

(57) ABSTRACT

Provided herein is a capacitor and method of forming a capacitor. The capacitor comprises an anode with an anode wire extending from the anode. A dielectric is on the anode and a conductive polymer is on the dielectric. The anode comprises at least one face comprising a surface area wherein at least 60% of the surface area is a land and no more than 40% of the surface area comprises perturbations.

70 Claims, 7 Drawing Sheets

MULTI-DIRECTIONAL AND MULTI-CHANNEL ANODE FOR ENHANCEMENT OF CAPACITOR PERFORMANCE

BACKGROUND

The present invention is related to the formation of solid electrolytic capacitors comprising multi-directional and multi-channel surface features. More specifically, the present invention is related to solid electrolytic capacitors comprising conductive polymeric cathodes. The multi-directional and multi-channel surface features improve flow of the conductive polymer solution thereby improving the coating characteristics.

There has been an ongoing desire in modern electronics to provide increased electrical functionality in a smaller package. This trend, referred to in the art as miniaturization, extends to the individual electronic components wherein each component is required to provide more functionality within a decreased volume. Of utmost importance herein are solid electrolytic capacitors wherein there is an ongoing desire to increase the capacitance, per unit volume, without detrimentally impacting other attributes such as equivalent series resistance (ESR), inductance or other electrical characteristics.

There have been two major developments in solid electrolytic capacitors in recent decades. One development has been in the replacement of manganese dioxide by conductive polymeric materials, and especially conductive thiophene based conductive polymeric materials, as the cathode. The other advance has come in the form of improved valve metal powders, particularly tantalum, wherein the charge density of the powders can now exceed 200,000 $\mu$FV/g. The high charge density allows for a decrease in anode volume, particularly anode thickness, at a given capacitance. While desirable this increased capacitance, for a given volume, has placed a significant burden on the interface between the conductive polymer and anode surface.

A limiting factor with conductive polymers is the ability to coat the surface of the dielectric without coating defects and with adequate coating thickness on corners and edges. In the past this problem has been solved by various techniques including chemical approaches; relying on mordants, crosslinkers or rheology modifiers; and physical approaches such as modifications of the edges or corners and increasing the surface area for better coating of the dielectric.

It has now been discovered that a significant problem with coating a dielectric of an anode is the run-off and build-up, or pooling, of solution or slurry on the surface as the liquid comprising the conductive polymer, or monomer, dries. Efforts to enhance run-off have been somewhat successful in mitigating pooling and altering the edges and corners has been somewhat successful in mitigating shearing at the corners and edges but the art still lacks a suitable solution to the problems of inadequate coating of the dielectric by conductive polymer.

Provided herein is an improved solid electrolytic capacitor. The improved solid electrolytic capacitor has more consistent coating thickness of the conductive polymer and therefore the high charge density powders, particularly at small thicknesses, can be more effectively utilized.

SUMMARY OF THE INVENTION

The present invention is related to an improved capacitor, and process for making an improved capacitor, wherein the anode or cathode of the capacitor has multi-dimensional and multi-channel perturbations on the surface to direct and control the flow of slurries or solutions containing conductive polymers and conductive polymer precursors.

A particular feature of the invention is the ability to withstand manufacturing and use without deterioration of the bond between the dielectric and cathode or between adjacent cathode layers.

A particular advantage is the ability to manufacture the capacitor, and particularly the anode or cathode of the capacitor, using conventional equipment.

These and other embodiments, as will be realized, are provided in capacitor comprising an anode with an anode wire extending from the anode. A dielectric is on the anode and a conductive polymer is on the dielectric. The anode comprises at least one face comprising a surface area wherein at least 60% of the surface area is a land and no more than 40% of the surface area comprises perturbations.

Yet another embodiment is provided in a method for forming a capacitor comprising:
  forming a pressed powder monolith comprising surfaces and an anode wire extending from the pressed powder monolith wherein at least one surface comprises a surface area wherein a land represents at least 60% of the surface area and protrusions represent no more than 40% of the surface area;
  sintering the pressed body monolith to form an anode with the anode wire extending from the anode;
  forming a dielectric on the anode; and
  forming a conductive polymer layer on the dielectric.

DESCRIPTION

The present invention is related to an improved solid cathode electrolytic capacitor. More specifically, the present invention comprises a capacitor comprising an anode with a multi-directional and multi-channel pattern. The pattern controls the flow of cathode slurry or solution thereby providing improved coating quality, particularly at or near edges and corners, resulting in improved performance. The multi-directional and multi-channel patterned anode is particularly advantageous for use with high charge density powder.

In the formation of a capacitor an anode body is formed by pressing a powder into a shape. The gross shape and perturbations to the gross shape are typically formed by the press as would be known of those of skill in the art. A dielectric is formed on the anode body, as known in the art, and a conductive polymer layer is formed on the dielectric. It would be understood that the dielectric conforms to the shape of the anode and the cathode essentially conforms to the shape of the dielectric with some deviation due to flow dynamics.

The conductive polymer is typically formed by dipping the anode body into a solution or slurry comprising a preformed conductive polymer or a solution or slurry comprising precursors to the conductive polymer. Throughout the description the terms slurry and solution are used interchangeably since the invention is equally suitable for use with either. It is common practice to dip the anode body into and out of the solution or slurry in a direction which parallels the long axis of the anode wire. The solution or slurry drains from the surface, due to gravity, upon lifting and it is the flow of the solution or slurry on the surface of the dielectric as the anode body exits the solution or slurry that is improved by the instant invention. In general, the flow is in a direction away from the anode wire.

The invention will be described with reference to the figures forming an integral, non-limiting component of the disclosure. Throughout the description similar elements will be numbered accordingly.

Figure 1:
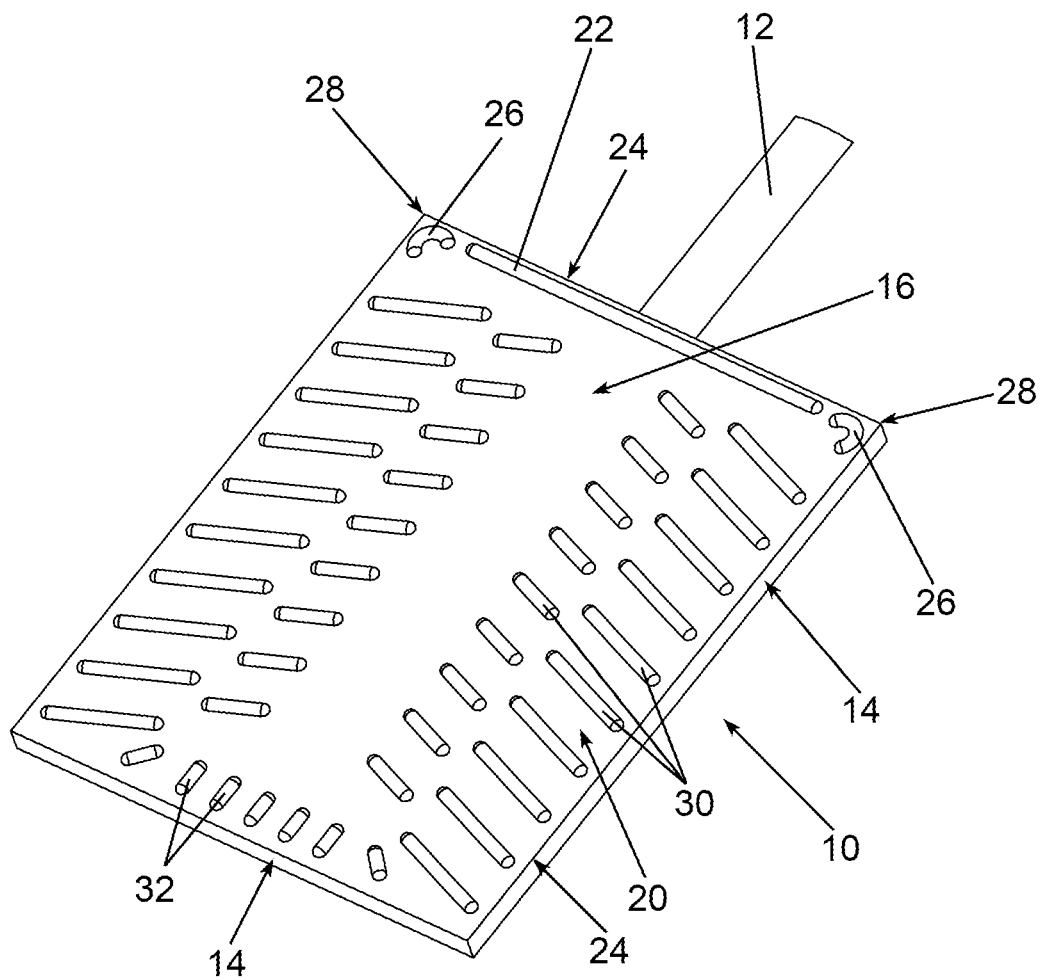
FIG. 1 is a schematic view of an embodiment of the invention.

An embodiment of the invention will be described with reference to FIG. 1 wherein an anode is illustrated schematically in top perspective view. In FIG. 1 the anode, 10, of the capacitor is represented as a rectangular prism, without limit thereto, wherein the anode as illustrated comprises larger major faces, 20, which are parallel to each other and minor faces, 14, which are smaller in area than the major faces. The anode comprises an anode wire, 12, extending therefrom. The anode wire may be attached to a minor face, 14, or it may be, and preferably is, embedded in the powder used to form the anode followed by compressing the powder around the anode wire to form a monolithic body which is then sintered. At least one face, and preferably all faces, of the anode comprise a land, 16, and perturbations wherein the perturbations are protrusions extending outward from the land or indentions extending inward from the land. The land represents the general shape of the anode without feature and constitutes a major portion of the area of the major face, 20, of the anode and the perturbations represent a minor portion of the area of the major face. The perturbations may be edge perturbations, 22, which are preferably linear and parallel to an edge, 24, wherein the edge perturbation slows the rate of flow of the slurry or solution thereby maintaining a concentration of slurry in the vicinity of the edge for a sufficient amount of time to decrease shear rupturing of the slurry or solution thereby improving edge coverage. Arcuate perturbations, 26, are preferably disposed in close proximity to a corner, 28, to maintain slurry in the vicinity of the corner for a sufficient amount of time to decrease shear rupturing of the slurry or solution thereby improving corner coverage. Body perturbations, 30, on the anode direct flow in a generally lateral direction, or perpendicular to the long axis of the anode wire. Body perturbations may be perpendicular to an edge, however, it is preferable that the body perturbations are at an angle of more than 90° but less than 140°, relative to a vector along the long axis of the anode wire extending from the face of egress, since this allows the gravity to assist in the flow of the slurry or solution towards the edge. The body perturbations may be the same size, different sizes, or combinations thereof. Edge directing perturbations, 32, are preferably perpendicular aligned with the direction of flow and are at an angle of ±20° relative to a vector along the long axis of the anode wire.

Figure 2:
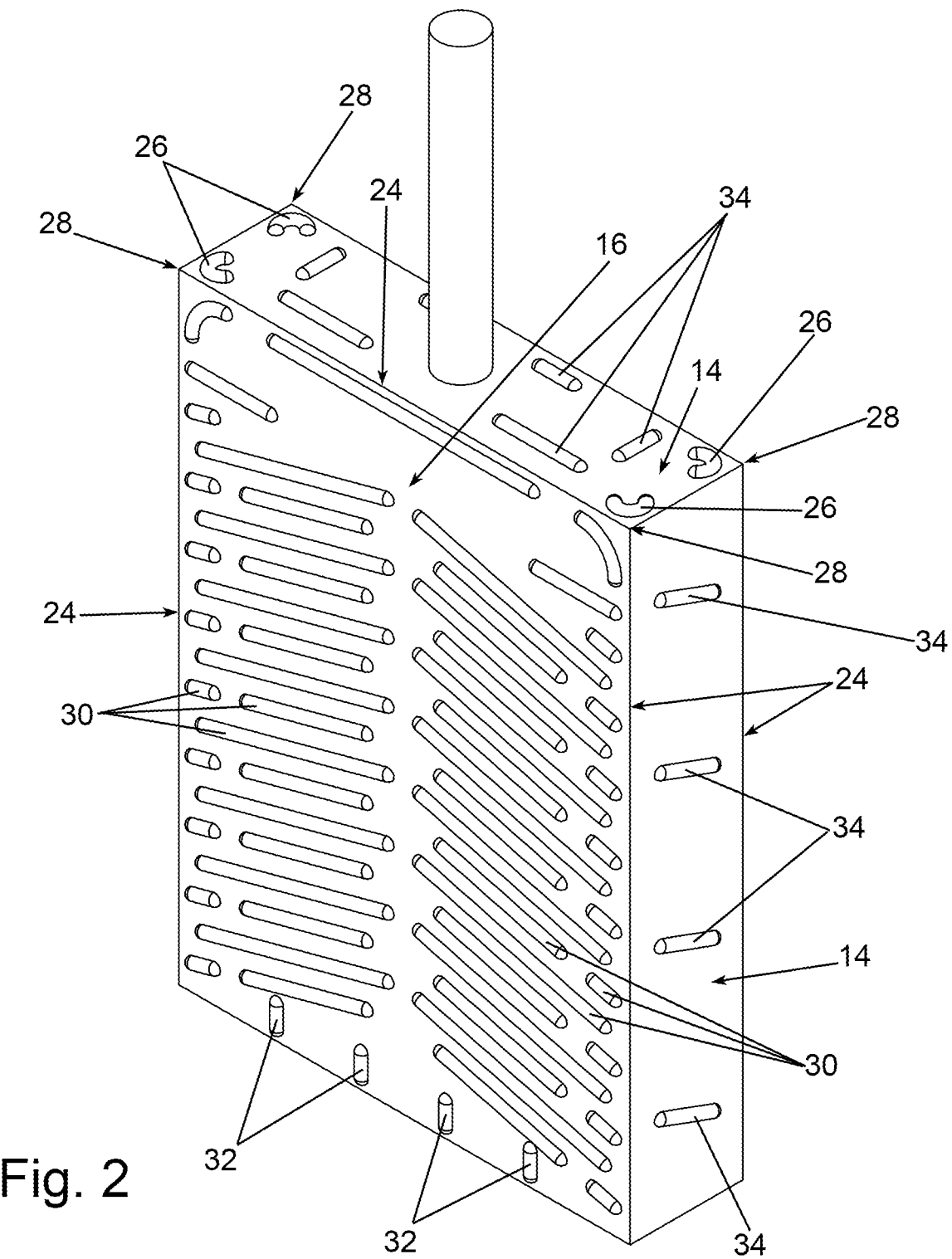
FIG. 2 is a schematic perspective view of an embodiment of the invention.

An embodiment of the invention is illustrated in schematic front perspective view in FIG. 2. In FIG. 2 alternating body perturbations of different length are illustrated. Side perturbations, 34, are perturbations on a minor face, 14. Side perturbations may be linear, arcuate or combinations thereof.

Figure 3:
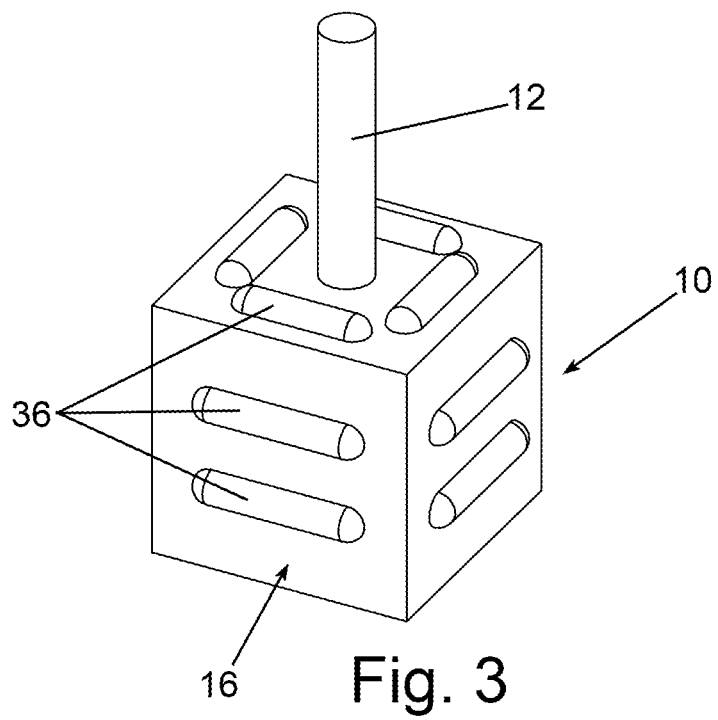
FIG. 3 is a schematic perspective view of an embodiment of the invention.

An embodiment of the invention is illustrated in FIG. 3 wherein the anode, 10, is illustrated schematically as a square prism or cube. Perturbations, 36, are on at least one face and preferably on at least all faces not perpendicular to the long axis of the anode wire, 12.

Figure 5:
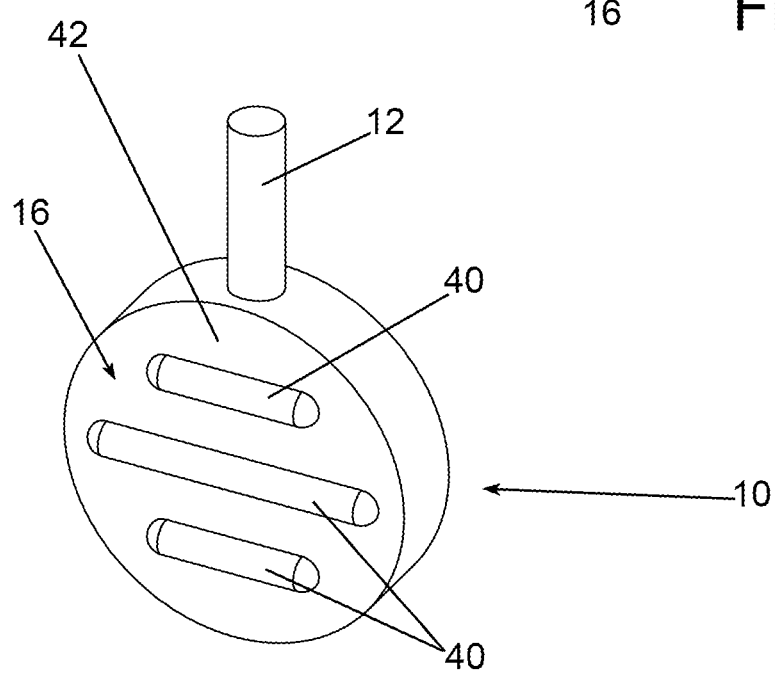
FIG. 5 is a schematic perspective view of an embodiment of the invention.
Figure 4:
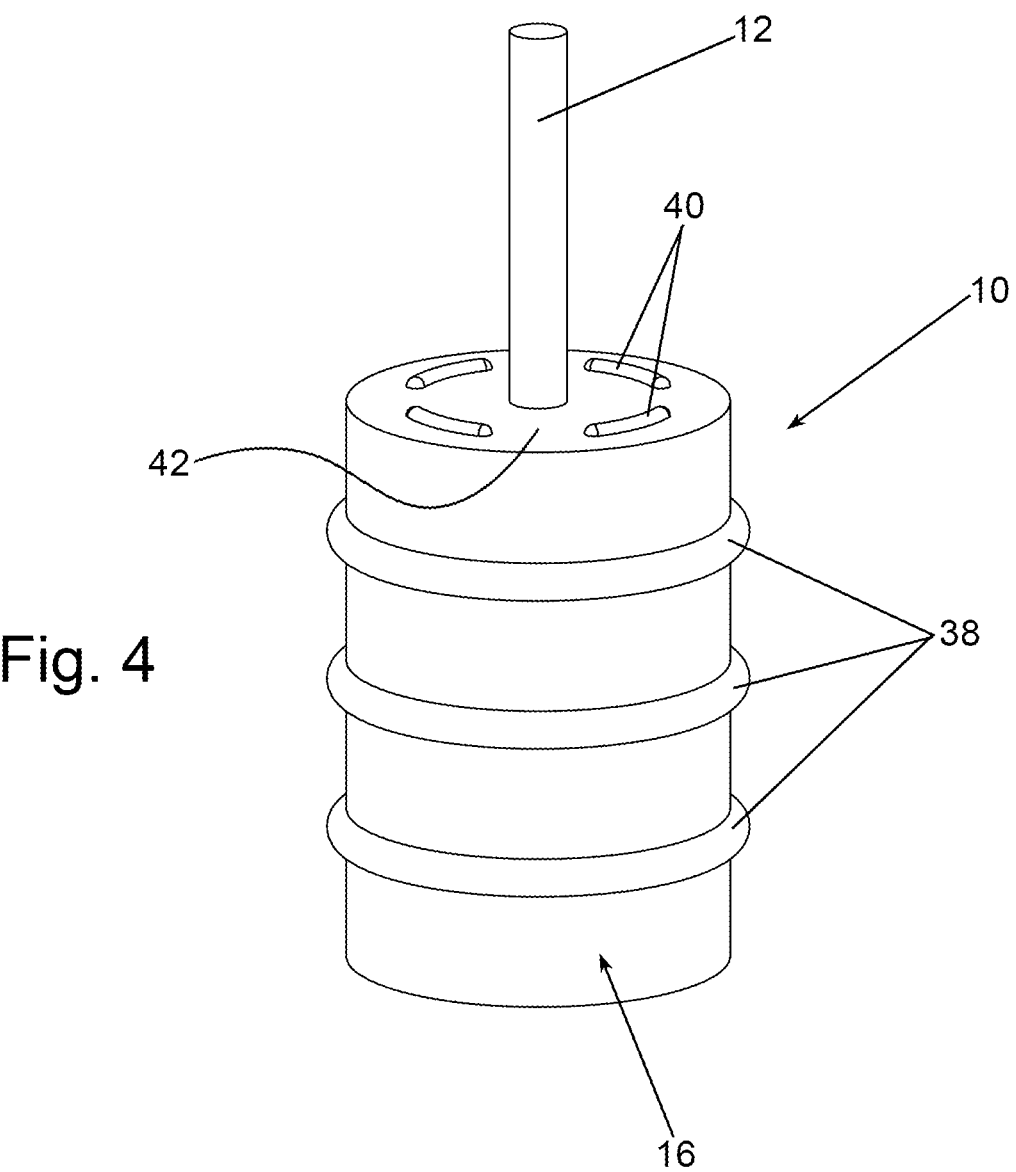
FIG. 4 is a schematic perspective view of an embodiment of the invention.

Embodiments of the invention are illustrated schematically in FIGS. 4 and 5 wherein the anode, 10, is represented as a cylinder. In FIG. 4, the anode wire extends perpendicular from a circular face. In FIG. 5, the anode wire extends parallel to a circular face. Perturbations which are preferably arcuate perturbations, 40, may be present on a circular face, 42, or perturbations, which are preferentially circumnavigation perturbations, 38, may be present on the cylindrical face, 44.

Figure 6:
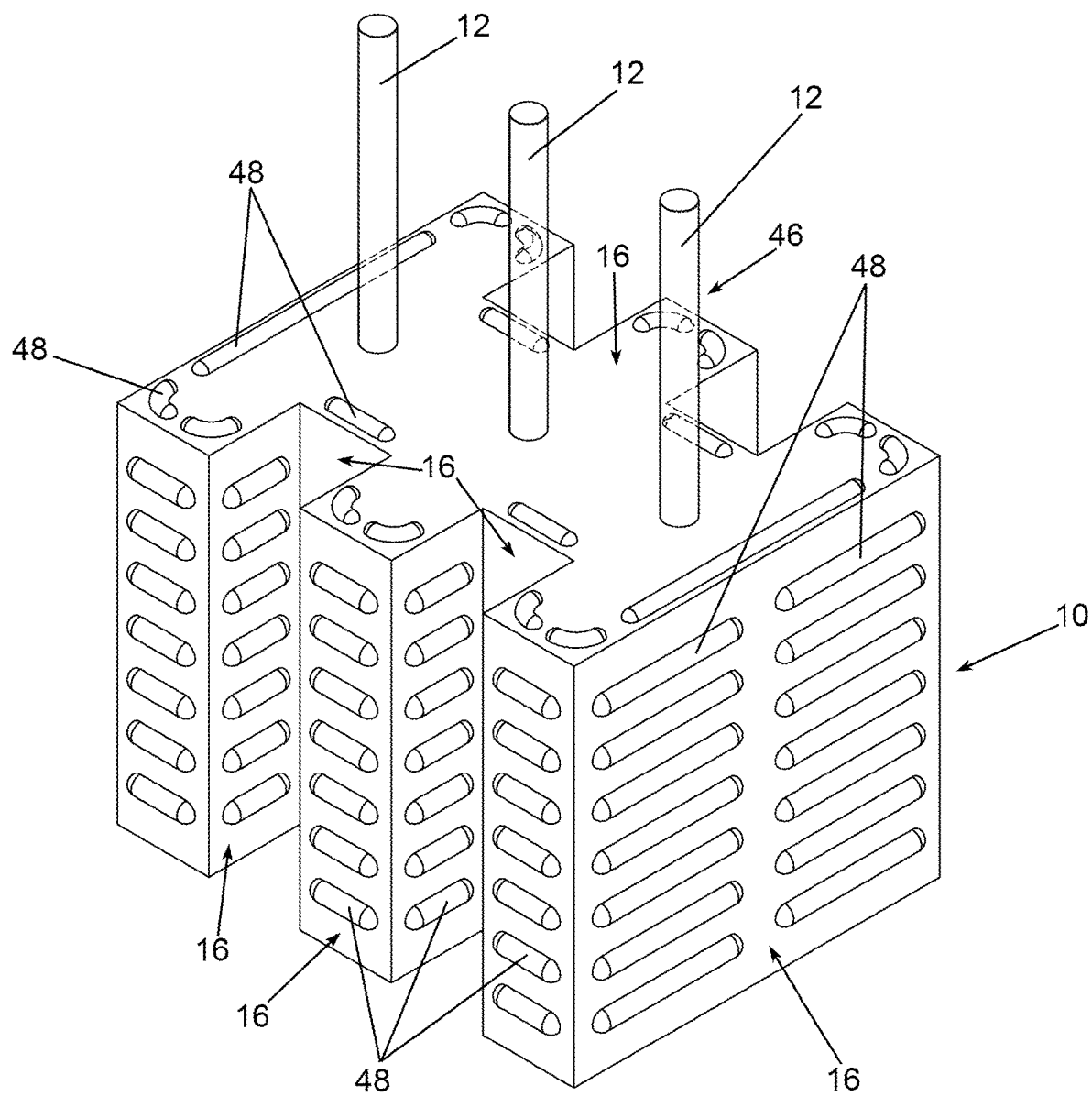
FIG. 6 is a schematic perspective view of an embodiment of the invention.

An embodiment of the invention is illustrated schematically in FIG. 6. In FIG. 6 the anode, 10, comprises flutes, 46, which provide for an increase in surface area within a given volume. At least one anode wire, 12, extends from one face of the anode with multiple anode wires being optional and preferred. Perturbations, 48, on at least one surface of the anode provide preferential flow to insure adequate coverage of the edges and corners as realized from the discussion herein.

A major face or minor face may have a multiplicity of perturbations selected from edge perturbations, arcuate perturbations, body perturbations, edge directing perturbations, circumnavigation perturbations or any combination thereof with the size or shape of each perturbation not limited by the others. It is preferably to have a multiplicity of perturbations which function as a set to control flow. By way of non-limiting example, it is preferable to have a multiplicity of, preferably parallel, body perturbations preferably equally spaced to insure adequate flow towards the edge. Similarly, without limitation, it is preferable to have a multiplicity of preferably parallel edge direction perturbations or circumnavigational perturbations, preferably equally spaced. Arcuate perturbations are preferred to be closer to the face of egress of the anode wire and are less advantageous on the furthest extent of the body relative to the face of egress of the anode wire.

The perturbations function by directing flow of the slurry comprising conductive polymer, or conductive polymer precursors, to or from areas of deficiency or accumulation. At least a majority of the perturbations are within the boundaries of the major surface and do not extend to the edge of a face in any direction.

Perturbations represent no more than an effective surface area of 40% and the land represents an effective surface area of at least 60%. More preferably the perturbations represent no more than an effective surface area of 40% and the land represents an effective surface area of at least 60%. By way of non-limiting example, and with reference to FIG. 1, the area bound by four edges, 24, represents the surface area of the major face, 20. That portion of the surface area comprising perturbations is the effective surface area which is not planar and therefore not the land. Similarly, with reference to FIG. 4, the surface of the cylinder, excluding the circular faces, is the surface area of the face and perturbations represent no more than an effective surface area of 40% of the surface area of the face.

The size of the perturbations is large enough to impact flow on the surface of the body but no so large as to cause the formation of pools of solution. In a preferred embodiment, the perturbations extend of at least 0.005 mm to no more than 0.45 mm as measured perpendicular from the face. The width of the perturbations, measured parallel to the land, and perpendicular to the perturbation, is at least 0.005 mm to no more than 0.5 mm. Above about 0.45 mm in height the perturbations cause pooling which is undesirable. Below about 0.005 mm the ability to divert flow is insufficient to warrant the formation of the perturbations. Below a width of about 0.005 mm the perturbations have insufficient structural integrity to withstand the dipping process. Above a width of about 0.50 mm the surface of the perturbation begins to mimic a land thereby creating additional areas susceptible to poor coverage. The length of the perturbations is limited by the size of the anode with the maximum length of the perturbations being as long as possible without reaching an edge or corner.

Figure 7:
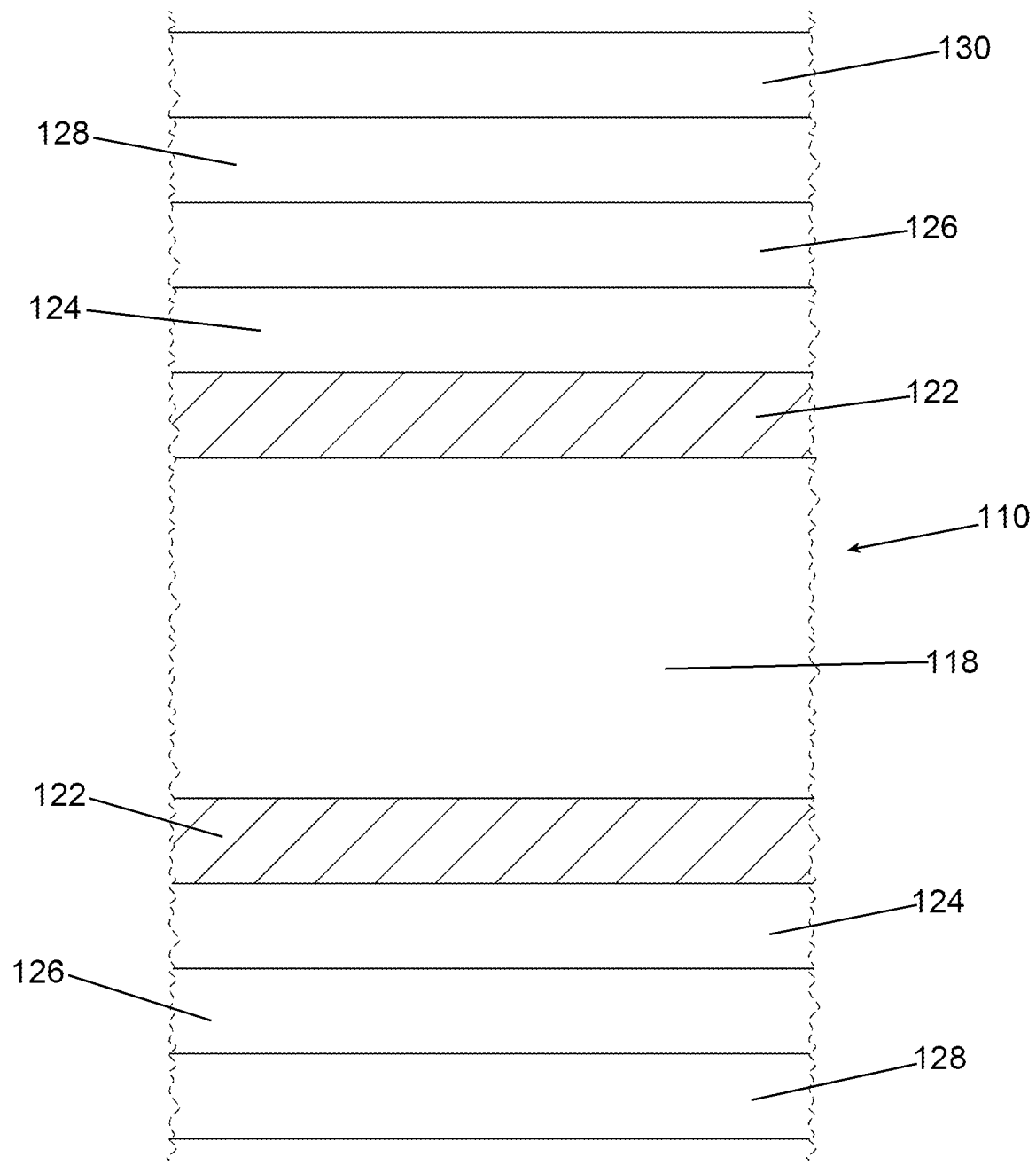
FIG. 7 is a schematic cross-sectional view of an embodiment of the invention.

A partial cross-sectional view of a capacitor is illustrated schematically in FIG. 7. In FIG. 7, the anode, 118, of the capacitor, 110, has a dielectric, 122, formed thereon and preferably the entire anode has a dielectric thereon. A conductive polymer layer, 124, is on the dielectric with the understanding that the conductive polymer layer does not extend beyond the dielectric and therefore the conductive polymer and anode do not come into direct electrical contact. A series of adhesion layers are typically required to insure adhesion to an external termination. The adhesion layers typically include a carbon containing layer, 126, which adheres to the conductive polymer layer, followed by a metal containing layer, 128, which adheres to the carbon containing layer. An optional but preferred external termination, 130, also referred to as a lead or lead frame to those of skill in the art, is in electrical contact with the metal containing layer and typically adhered thereto by a conductive adhesive such as a solder, transient liquid phase sintering adhesive or the like. The conductive polymer layer, carbon containing layer and metal containing layers may be formed by the application of multiple layers.

The formation of the anode is preferably accomplished by pressing a powder of the desirable valve metal into a monolithic body followed by sintering of the monolithic body of pressed powder to form an anode. To achieve the pattern on the anode a press is prepared comprising a shape and size suitable for forming the intended surface lands and perturbations as would be understood to those of skill in the art.

With further reference to FIG. 1, a preferred anode has a high aspect ratio defined as the ratio of the equivalent diameter of a major face to the average thickness. The two major faces are parallel to each other and separated by the average thickness. The minor faces are preferably perpendicular to the major faces and preferably each adjacent minor face is perpendicular. The equivalent diameter is the diameter of a circle having the same surface area as the major face. For a rectangle, the surface area is defined as W×L wherein W is width and L is length. The surface area for other shapes could be easily determined. The average thickness is T. More specifically, for a rectangle, the equivalent diameter ($D_E$) can be determined by the equation:

$$D_E = (4*W*L/\pi)^{0.5}$$

and the aspect ratio (AR) is defined by the equation:

$$AR = D_E/T.$$

It is preferred that the aspect ratio be over 1 to no more than 10. At an aspect ratio of about 1 the synergistic advantages of the high charge density powder, conductive polymer cathode, and pattern is not sufficient to justify the modification. Above an aspect ratio of about 10 the anode is easily fractured and becomes difficult to handle in conventional manufacturing equipment. More preferably the aspect ratio is at least 2 to no more than 7 with about 3 to 6 being most preferred.

The average thickness, T, of the anode is preferably at least 0.3 mm to no more than about 4 mm. Below about 0.3 mm the physical integrity of the anode is insufficient and handling in conventional manufacturing environments results in extreme yield loss due to breakage. Above about 4 mm the capacitive volume, or capacitance as a function of volume, for the eventual capacitor degrades and therefore the advantages offered by the instant invention are not realized. It is more preferable that the anode have a thickness of no more than 1 mm.

The anode preferably comprises a valve metal or conductive oxide of the valve metal with particularly preferred anode materials being selected from aluminum, tantalum, niobium and NbO with tantalum being most preferred. The anode has a dielectric thereon, which is preferably an oxide of the valve metal. A cathode is on the dielectric wherein the cathode is preferably a conductive polymer and most preferably a conductive thiophene such as poly(3,4-polyethylene dioxythiophene) (PEDT) or derivatives thereof. Dielectric formation and the formation of a cathode from conductive polymer is well known to those of skill in the art and further elaboration herein is not necessary.

The powder used to form the anode has a charge density of at least 6,000 μFV/g, more preferably at least 200,000 μFV/g, more preferably at least 300,000 μFV/g, more preferably at least 400,000 μFV/g and most preferably at least 500,000 μFV/g as determined for tantalum or for a valve metal other than tantalum, such as niobium, a powder having an equivalent surface area to tantalum having the preferred capacitive density.

Figure 8:
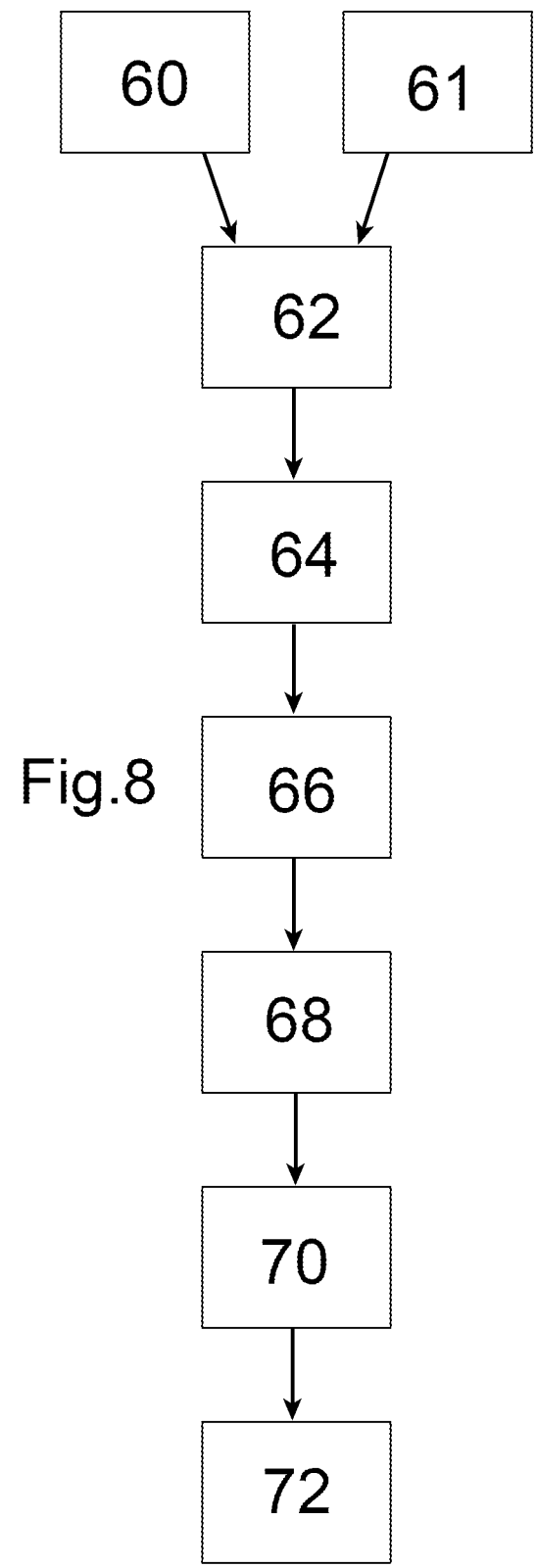
FIG. 8 is a flow-chart representation of an embodiment of the invention.

The formation of a capacitor will be described with reference to FIG. 8. A press comprising plates suitable for forming the desired micropattern is charged with a high charge density powder and the powder is pressed, at 60, forming a monolithic body. The pressing of a powder to form a monolith is well known to those of skill in the art and not altered herein except for the use of a press having a patterned surface as would be understood to those of skill in the art. Additives and additional components can be added to the powder as well known to those of skill in the art with binders and/or lubricants being understood to be advantageous and their use is not altered by the invention described herein.

In another embodiment, the monolith can be formed, at 61, by alternate techniques such as 3-D printing of a ceramic precursor, screen printing techniques, casting techniques and the like or combinations thereof. With 3-D printing of ceramic precursors it is known in the art to include additives to improve the thixotropic properties of the ceramic precursor.

The monolithic body is sintered at 62 to form an anode. The anode is anodized, at 64, to form a dielectric on the surface of the anode wherein the dielectric is preferably an oxide of the valve metal. Anodization is well known in the art and the method of anodizing is not particularly limited herein. Other dielectrics could be incorporated without departing from the scope of the invention but oxides of the anode are widely used in the art and preferable for manufacturing conveniences.

In an embodiment the anode can be prepared by multiple steps including combinations of pressing, 3-D printing and screen printing. A portion of the anode can be formed by pressing a powder, with or without the perturbations present, to form a primary monolith. The size, preferably just thickness, of the primary monolith can then be increased by 3-D printing additional material onto the primary monolith or by screen printing a pattern either of which can form the perturbations discussed elsewhere herein. The primary monolith can be sintered prior to adding additional material or the monolith may be formed to the intended size and shape and the completed monolith sintered.

A cathode layer is formed on the dielectric at 66. The cathode is a conductive layer and may be formed from conductive polymers, such as conductive thiophenes with poly(3,4-ethylenedioxythiophene) (PEDT) or derivatives thereof being exemplary for use in demonstrating the invention. PEDT is commercially available as a slurry with suitable counterions. Monomers and oxidants are also commercially available for formation of PEDT in-situ as well known to those of skill in the art. The cathode is formed by coating, in-situ polymerization, screen printing, 3-D printing, other techniques as known to those of skill in the art or combinations thereof.

In an embodiment the cathode can be formed by the sequential formation of sublayers with each sublayer being independently formed by coating, 3-D printing, or screen printing with optional drying and/or curing of individual sublayers prior to subsequent sublayer formation or by curing the assembly of formed layers. The protrusions may be formed in one or more of the sequential layers.

It is widely understood that external terminations are difficult to form on the cathode, particularly with a conductive polymeric cathode, and additional layers are typically included to facilitate termination. In particular, carbon containing layers, formed at 68, are overcoated with metal layers, at 70. Silver or nickel are suitable for demonstration of the invention without limit thereto. Carbon containing layers and metal containing layers are formed by coating and/or electroplating as well known to those of skill in the art. The formation of the carbon containing layers and metal containing layers is not altered by the invention.

The capacitor is typically finished at 72 which may include attachment of external anode terminations in electrical contact with the anode wire, external cathode terminations in electrical contact with the cathode, encapsulating in an insulator, testing, packaging and the like. The external terminations are well known and not altered by the invention.

EXAMPLE

A series of V case size anodes having dimensions of 3.25 mm (0.128") wide, 4.7 mm (0.18") long and 0.90 mm (0.035") thick were prepared with anode wires having a diameter of 0.381 mm (0.015") extending therefrom. The anodes were prepared using 200,000 CV/g Ta powder (STA 200K from HC Starck) with a specially fabricated press die into a monolithic body followed by sintering of the monolithic body of pressed powder to form an anode. To achieve the patterning on the anode the specially fabricated press was prepared comprising indentations having the shape and size of the intended surface lands and perturbations. A set of anodes were prepared having identical dimensions with no perturbations as a control. A second set of anodes was prepared having identical dimensions with two stacks of 10 parallel protruding perturbations on each side of each face, all perpendicular to the anode wire, wherein the perturbations had a width of 0.254 mm, a height of 0.15 mm and length 1.4 mm as Inv. 1. A third set of anodes was prepared having identical dimensions with two stacks of 6 parallel protruding perturbations on each side of each face wherein the perturbations which were at an angle of about 45° or 135° relative to a vector extending from the body along the axis of the anode wire. The perturbations had a width of 0.254 mm, a height of 0.15 mm and length of 1.67 mm. One additional perturbation of the same size was on each of the left and right partition on each face perpendicular to the anode wire. The sintered anodes were anodized at 14V using phosphoric acid electrolyte to form a dielectric on the tantalum anode. The anodized anodes thus formed were dipped into a solution of iron (III) toluenesulfonate oxidant for 1 minute and sequentially dipped into ethyldioxythiophene monomer for 1 minute. The coated anodized anodes were washed to remove excess monomer and by-products of the reactions after the completion of 60 minutes polymerization, which formed a thin layer of conductive polymer (PEDOT) on the dielectric of the anodes. This process was repeated several times. The anodes were washed, and a conventional graphite coating was applied followed by a conventional silver layer. The silvered anodes were tested for average leakage current. The control had an average leakage current of about 1.62 μA, Inv. 1 had an average leakage current of about 0.78 μA and Inv. 2 had an average leakage current of about 1.01 μA.

The invention has been described with reference to the preferred embodiments without limit thereto. One of skill in the art would realize additional embodiments and improvements which are not specifically stated herein but which are within the scope of the invention as set forth in the claims appended hereto.

The invention claimed is:

1. A capacitor comprising:
   an anode;
   an anode wire extending from said anode;
   a dielectric on said anode; and
   a conductive polymer on said dielectric;
   wherein said anode comprises at least one face and at least one perturbation wherein said face comprises a surface area wherein at least 60% of said surface area is a land and no more than 40% of said surface area comprises perturbations and wherein at least one said perturbation of said perturbations is at an angle of more than 90° but less than 140° relative to a vector along a long axis of said anode wire.

2. The capacitor of claim 1 wherein said land represents at least 70% of said surface area and perturbations represent no more than 30% of said surface area.

3. The capacitor of claim 1 wherein at least a majority of said perturbations are within the boundaries of said face.

4. The capacitor of claim 1 wherein said perturbations are selected from protrusions and indentions.

5. The capacitor of claim 1 wherein at least one perturbation of said perturbations is selected from the group consisting of edge perturbation, arcuate perturbation, body perturbation, edge directing perturbation and circumnavigation perturbation.

6. The capacitor of claim 1 comprising a multiplicity of perturbations wherein at least two perturbations are parallel.

7. The capacitor of claim 1 wherein said perturbations have a height of at least 0.005 mm to no more than 0.45 mm.

8. The capacitor of claim 1 wherein said perturbations have a width of at least 0.005 mm to no more than 0.50 mm.

9. The capacitor of claim 1 wherein said anode comprises a valve metal.

10. The capacitor of claim 9 wherein said valve metal is selected from the group consisting of tantalum, aluminum, niobium and NbO.

11. The capacitor of claim 10 wherein said tantalum has a charge density of at least 6,000 µFV/g.

12. The capacitor of claim 11 wherein said tantalum has a charge density of at least 200,000 µFV/g.

13. The capacitor of claim 12 wherein said tantalum has a charge density of over 300,000 µFV/g.

14. The capacitor of claim 13 wherein said tantalum has a charge density of over 400,000 µFV/g.

15. The capacitor of claim 14 wherein said tantalum has a charge density of over 500,000 µFV/g.

16. The capacitor of claim 1 wherein said anode has an aspect ratio of at least 1 to no more than 10.

17. The capacitor of claim 16 wherein said aspect ratio is at least 2 to no more than 7.

18. The capacitor of claim 17 wherein said aspect ratio is at least 3 to no more than 6.

19. The capacitor of claim 1 wherein said anode has an average thickness of at least 0.3 to no more than about 4 mm.

20. The capacitor of claim 19 wherein said average thickness is no more 1 mm.

21. The capacitor of claim 1 wherein said conductive polymer comprises a thiophene.

22. The capacitor of claim 21 wherein said thiophene is poly(3,4-ethylenedioxythiophene).

23. The capacitor of claim 1 further comprising a carbon containing layer on said conductive polymer.

24. The capacitor of claim 23 further comprising a metal containing layer on said carbon containing layer.

25. The capacitor of claim 1 further comprising at least one of an anode external termination or a cathode external termination.

26. The capacitor of claim 1 wherein said anode has a shape selected from the group consisting of rectangular prism, cubic, cylindrical and fluted.

27. The capacitor of claim 1 wherein said anode comprises at least one major face and at least one minor face.

28. The capacitor of claim 27 wherein at least one said perturbation is on said major face.

29. The capacitor of claim 27 wherein at least one said perturbation is on said minor face.

30. The capacitor of claim 1 wherein said anode comprises at least one circular face.

31. The capacitor of claim 30 wherein said anode wire extends parallel to said circular face.

32. The capacitor of claim 30 wherein said anode wire extends perpendicular to said circular face.

33. The capacitor of claim 1 wherein said anode comprises flutes.

34. The capacitor of claim 33 comprising multiple anode wires.

35. A capacitor comprising:
an anode;
an anode wire extending from said anode;
a dielectric on said anode; and
a conductive polymer on said dielectric;
wherein said anode comprises at least one face comprising a surface area wherein at least 60% of said surface area is a land and no more than 40% of said surface area comprises perturbations wherein at least one said perturbation is at an angle no more than 20° relative to a vector along a long axis of said anode wire.

36. A method for forming a capacitor comprising:
forming a pressed powder monolith comprising surfaces and an anode wire extending from said pressed powder monolith wherein at least one surface of said surfaces comprises a surface area wherein a land represents at least 60% of said surface area and perturbations represent no more than 40% of said surface area and at least one perturbation of said perturbations is at an angle of more than 90° but less than 140° relative to a vector along a long axis of said anode wire;
sintering said pressed body monolith to form an anode with said anode wire extending from said anode;
forming a dielectric on said anode; and
forming a conductive polymer layer on said dielectric.

37. The method for forming a capacitor of claim 36 wherein said land represents at least 70% of said surface area and perturbations represent no more than 30% of said surface area.

38. The method for forming a capacitor of claim 36 wherein at least a majority of said perturbations are within the boundaries of said face.

39. The method for forming a capacitor of claim 36 wherein said perturbations are selected from protrusions and indentions.

40. The method for forming a capacitor of claim 36 wherein at least one perturbation of said perturbations is selected from the group consisting of edge perturbation, arcuate perturbation, body perturbation, edge directing perturbation and circumnavigation perturbation.

41. The method for forming a capacitor of claim 36 comprising a multiplicity of perturbations wherein at least two perturbations are parallel.

42. The method for forming a capacitor of claim 36 wherein said perturbations have a height of at least 0.005 mm to no more than 0.45 mm.

43. The method for forming a capacitor of claim 36 wherein said perturbations have a width of at least 0.005 mm to no more than 0.50 mm.

44. The method for forming a capacitor of claim 36 wherein said forming of said monolith comprises charging a press with a valve metal powder and pressing said valve powder.

45. The method for forming a capacitor of claim 44 wherein said valve metal power is tantalum powder.

46. The method for forming a capacitor of claim 45 wherein said tantalum has a charge density of at least 6,000 µFV/g.

47. The method for forming a capacitor of claim 46 wherein said tantalum powder has a charge density of at least 200,000 µFV/g.

48. The method for forming a capacitor of claim 47 wherein said tantalum powder has a charge density of over 300,000 µFV/g.

49. The method for forming a capacitor of claim 48 wherein said tantalum powder has a charge density of over 400,000 µFV/g.

50. The method for forming a capacitor of claim 49 wherein said tantalum powder has a charge density of over 500,000 µFV/g.

51. The method for forming a capacitor of claim 36 wherein said anode has an aspect ratio of at least 1 to no more than 10.

52. The method for forming a capacitor of claim 51 wherein said aspect ratio is least 2 to no more than 7.

53. The method for forming a capacitor of claim 52 wherein said aspect ratio is least 3 to no more than 6.

54. The method for forming a capacitor of claim 36 wherein said anode has an average thickness of at least 0.3 to no more than about 4 mm.

55. The method for forming a capacitor of claim 36 wherein said anode has an average thickness of no more than 1 mm.

56. The method for forming a capacitor of claim 36 wherein said conductive polymer comprises a thiophene.

57. The method for forming a capacitor of claim 56 wherein said thiophene is poly(3,4-ethylenedioxythiophene).

58. The method for forming a capacitor of claim 36 further comprising forming a carbon containing layer on said conductive polymer.

59. The method for forming a capacitor of claim 58 further comprising forming a metal containing layer on said carbon containing layer.

60. The method for forming a capacitor of claim 36 further comprising attaching a cathode external termination to said cathode.

61. The method for forming a capacitor of claim 36 wherein said anode has a shape selected from the group consisting of rectangular prism, cubic, cylindrical and fluted.

62. The method for forming a capacitor of claim 36 wherein said anode comprises at least one major face and at least one minor face.

63. The method for forming a capacitor of claim 62 wherein at least one said perturbation is on said major face.

64. The method for forming a capacitor of claim 62 wherein at least one said perturbation is on said minor face.

65. The method for forming a capacitor of claim 36 wherein said anode comprises at least one circular face.

66. The method for forming a capacitor of claim 65 wherein said anode wire extends parallel to said circular face.

67. The method for forming a capacitor of claim 65 wherein said anode wire extends perpendicular to said circular face.

68. The method for forming a capacitor of claim 36 wherein said anode comprises flutes.

69. The method for forming a capacitor of claim 68 comprising multiple anode wires.

70. A method of forming a capacitor comprising:
forming a pressed powder monolith comprising surfaces and an anode wire extending from said pressed powder monolith wherein at last one surface of said surfaces comprises a surface area wherein a land represents at least 60% of said surface area and perturbations represent no more than 40% of said surface area wherein at least one said perturbation is at an angle of no more than 20° relative to a vector along a long axis of said anode wire;
sintering said pressed body monolith to form an anode with said anode wire extending from said anode;
forming a dielectric on said anode; and
forming a conductive polymer layer on said dielectric.

* * * * *